United States Patent [19]

Siegel

[11] 4,250,720

[45] Feb. 17, 1981

[54] DISPOSABLE NON-CYCLIC SORPTION TEMPERATURE-CHANGERS

[76] Inventor: Israel Siegel, 351 W. 71 St., New York, N.Y. 10023

[21] Appl. No.: 19,899

[22] Filed: Mar. 12, 1979

[51] Int. Cl.³ .............................................. F25B 17/08
[52] U.S. Cl. ................................................. 62/480
[58] Field of Search ......................................... 62/480

[56] References Cited

U.S. PATENT DOCUMENTS

| | | | |
|---|---|---|---|
| 2,144,441 | 1/1939 | Schlumbohm | 62/480 X |
| 3,970,068 | 7/1976 | Sato | 62/294 X |
| 4,126,016 | 11/1978 | Greiner | 62/480 X |

FOREIGN PATENT DOCUMENTS 591482  1/1934  Fed. Rep. of Germany ............ 62/480

*Primary Examiner*—Lloyd L. King

[57] ABSTRACT

The invention consists of disposable temperature changing devices which can be stored for unlimited periods without losing their temperature changing potential. Water boiling in an air-evacuated chamber serves as the working liquid. A dessicant in a separate container communicates with the vapor phase of the water, and removes the vapor generated by the boiling water. Unlimited storage of the temperature changing potential of the invention is obtained by the closing of the communication between the containers.

5 Claims, 4 Drawing Figures ly consumed only after their temperature is lowered to 5°–10° C. This has been usually accomplished by the utilization of ice cubes as rapid disposable cooling agents. The utilization of ice as cooling agent suffers from the fact that the ice has a limited life span at above freezing ambient temperature. The ice cubes may, therefore, not be available when the cooling action is required. This is especially likely to occur when the beverages are consumed in cars, beaches or picnic areas. One of the main objectives of the present device is to provide a rapid cooling device which can be stored for unlimited periods without losing its cooling potential.

DISPOSABLE NON-CYCLIC SORPTION TEMPERATURE-CHANGERS

BACKGROUND AND OBJECTIVES

The invention relates to temperature changing devices and in particular to disposable beverage coolers and warmers.

A variety of foods and beverages require cooling only before consumption. For example, soft drinks in sealed bottles or cans can be stored indefinitely at average ambient temperature of 20°–25° C., but are preferably consumed only after their temperature is lowered to 5°–10° C. This has been usually accomplished by the utilization of ice cubes as rapid disposable cooling agents. The utilization of ice as cooling agent suffers from the fact that the ice has a limited life span at above freezing ambient temperature. The ice cubes may, therefore, not be available when the cooling action is required. This is especially likely to occur when the beverages are consumed in cars, beaches or picnic areas. One of the main objectives of the present device is to provide a rapid cooling device which can be stored for unlimited periods without losing its cooling potential.

The invention utilizes water as a cheap and disposable working liquid. It exploits the fact that the boiling point of a liquid is lowered by a vacuum. In the invention water boils in an air-evacuated sealed chamber and absorbs heat from its environment. To prevent the development of a vapor back pressure in the sealed container, which would stop the boiling of the water, the vapor generated by the boiling water must be continuously removed from the sealed chamber. This must be done without an opening in the chamber which would allow outside air into the chamber. In the present invention this is accomplished through the action of a dessicant kept in a separate air-evacuated container. A tube which can be opened and closed communicates between the dessicant and water chambers. When the communication between the water and the dessicant chambers is open, the dessicant absorbs the vapor generated by the boiling water. This prevents the vapors from exerting a counter-pressure upon the boiling water, and allows the water to boil until its temperature is lowered to its relatively low vacuum-boiling point temperature. When the communication between the water-chamber and the dessicant-chamber is closed, the vapor accumulates in the water-chamber and stops the boiling of the water. This is utilized as means for obtaining an unlimited storage of the device without loss of its cooling potential.

An additional objective of the invention is to provide physical means for warming of an object. This can be achieved by the fact that when the vapor is absorbed by a dessicant, heat of absorption is generated. Experimental studies of a model of the invention have shown that this raises the temperature of the dessicant to a temperature which is higher than the original ambient temperatures of both the water and the dessicant. The relatively warm dessicant can then transfer its heat to any desired object, such as a cold car engine or a bottle of milk for a nursing baby.

Other objectives of the invention will become evident during the full description of the invention in the Detailed Description Section.

SUMMARY

The invention consists of an air-evacuated chamber which is partially filled with water. A second air-evacuated chamber has a dessicant with a relatively high affinity for water. A tube communicates between the vapor phase of the water-chamber and the dessicant-chamber. The vacuum in the water-chamber causes the water to boil at ambient temperatures. When the communication between the chambers is closed, the vapor generated by the boiling water accumulates in the water-chamber, and exerts a counter-vapor pressure upon the water. This stops the boiling of the water, and the cooling or warming potential of the water is undiminished during unlimited storage periods.

The cooling or warming potential of the device is initiated by the opening of the communication between the chambers. This causes the vapor to leave the water-chamber and to be adsorbed or absorbed by the dessicant. This reduces the vapor pressure in the water-chamber and allows a vigorous boiling of the water. The evaporation of the water causes the water to absorb heat from its environment and thus cool its surrounding. In the cooler, this is used to obtain a cooling effect. When the dessicant adsorbs the water vapor, heat of adsorption is generated in the dessicant. This raises the temperature of the dessicant to above ambient temperature. In a warmer device this is utilized to obtain a warming effect.

DETAILED DESCRIPTION

Figure 1:
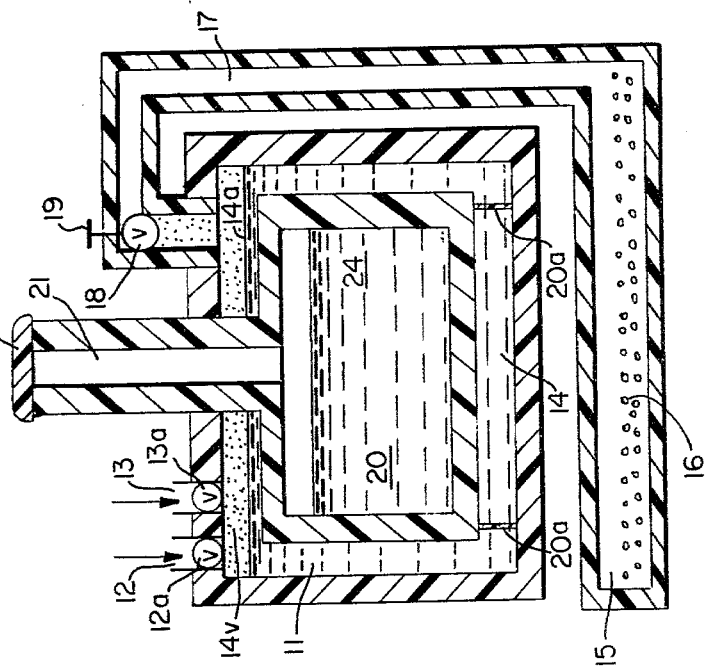
FIG. 1 is a cross-sectional view of an embodiment of the invention.

Referring to FIG. 1, there is shown a chamber 11. Present on the top wall of chamber 11 are inlet 12 and outlet 13. Valve 12a closes and opens inlet 12. Valve 13a closes and opens outlet 13. The arrangement is that valve 13a is opened and air is removed from the chamber 11 through outlet 13. When a predetermined vacuum has been obtained, valve 13a closes the outlet 13. Valve 12a is then opened and a water 14 is introduced into chamber 11 through inlet 12. After a predetermined quantity of the liquid has been transferred into chamber 11, the inlet 12 is closed. The liquid 14 is thus kept under a partial vacuum in chamber 11. The degree of vacuum in chamber 11 is such that it lowers the boiling point of the liquid to a predetermined cold temperature. The liquid 14 evaporates to form a vapor phase 14v above a liquid level 14a of liquid 14. The walls of chamber 11 are built from materials such as plastic, which are strong enough to resist the outside atmospheric pressures upon the air-evacuated chamber 11.

Present below chamber 11 is another chamber 15. Inside the chamber 15 there is a dessicant 16, such as anhydrous calcium-sulfate. A pipe 17 communicates between the vapor phase 14v of chamber 11 and the top of chamber 15. A valve 18 opens and closes the pipe 17. A manual valve handle 19 closes and opens valve 18. The arrangement is that the valve 18 is normally in a position which keeps pipe 17 closed so that there is no communication between chambers 11 and 15. When handle 19 is pulled, the valve 18 is displaced and a communication between chambers 11 and 15 is established through pipe 17.

The operation of the cooler is as follows. When a cooling action is not desired, the valve 18 closes pipe 17 and prevents a communication between chambers 11 and 15. The vacuum in chamber 11 causes the liquid 14 to boil until the vapor pressure in chamber 11 becomes equal to the vapor pressure of the water 14. This stops the evaporation of liquid 14. The device is then stored at ambient temperature without exerting a cooling effect.

When a cooling effect is desired the handle 19 is pulled to open valve 18 and establish a communication between chambers 11 and 15. When this communication is established the vapor in vapor phase 14v leaves chamber 11, enters chamber 15, and is adsorbed or absorbed by dessicant 16. This causes a reduction in the vapor pressure in chamber 11 and allows the liquid 14 to boil and lose heat. The establishment of a counter-vapor pressure by the generated vapor upon liquid 14 is prevented by the continuous removal of the vapor by dessicant 16. The liquid 14 boils continuously before the dessicant 16 becomes saturated or until the temperature of the liquid 14 drops to below its boiling point the liquid 14 may be a beverage such as beer or coke. The device is discarded after the cooled beverage has been consumed.

FIG. 1 can likewise be used to illustrate an embodiment of the invention which functions as a warming device. The components and the operation of the warmer are similar to those described for the cooler. The heat of adsorption, evolved when the vapor generated by boiling liquid 14 is adsorbed by dessicant 16, raises the temperatures of the dessicant 16 and the chamber 15. The heat of the chamber 15 and dessicant 16 may be transferred to any associated body (not shown).

EXAMPLE

The following is a numerical example illustrating a cooling action of the device. It is understood that the figures given are for illustrative purposes only and changes can be made without departing from the essence of the invention. The calculations are based upon facts obtained from the Handbook of Chemistry and Physics (The Chemical Rubber Publisher Company, 1962).

Container 11 has 250 ml of water. Container 15 has 100 grams of anhydrous calcium sulfate. The vacuum induced in containers 11 and 15 is equal to 6 mm Hg. This lowers the boiling point of the water to about 4° C. The ambient temperature is 20° C. When the communication 17 between containers 11 and 15 is closed the water 14 boils until the total pressure in container 11 becomes equal to the vapor pressure of the water at 20° C., which is about 17.5 mm Hg. The device can then be stored for unlimited periods without losing its cooling potential. When a cooling effect is wanted the tube 17 is opened. This causes the vapor which has accumulated in container 11 to be adsorbed by the dessicant 16, and allows a continuous boiling of the water 14. The dessicant can adsorb water vapor which is equal to 10–15% of its weight. This is equal to 10–15 grams of water vapor. The boiling of the water continues until its temperature drops to about 4° C. This requires the transfer of about 4,000 calories from the water to the dessicant through the evaporation and sorption of a minimum of 7 grams of water.

Figure 2:
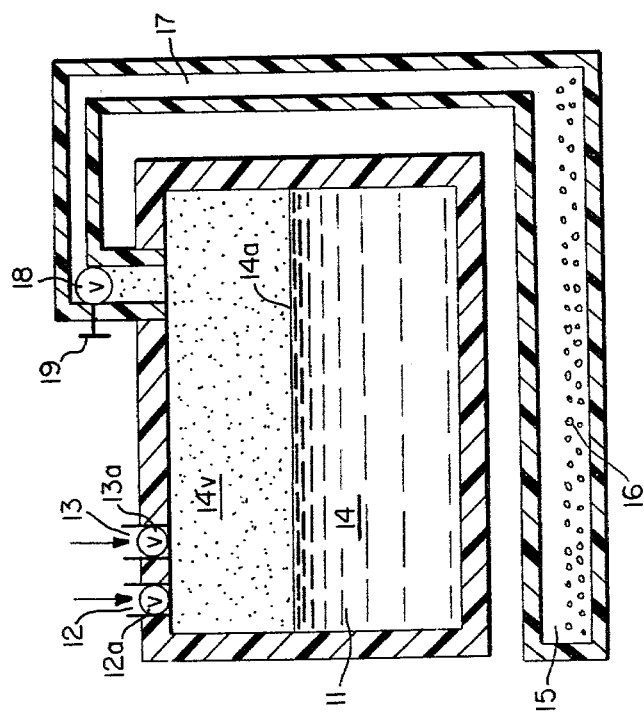
FIG. 2 is a cross-sectional view of the invention which is adapted to be part of a doubled-wall bottle.

FIG. 2 illustrates another embodiment of the invention. It is essentially similar to the embodiment illustrated in FIG. 1, except that liquid 14 consists of water and is designed to cool an immersed container 20. The container 20 is immovably attached to the bottom wall of chamber 11 through leg 20a. Neck 21 of container 20 passes through the top wall of chamber 11 to the outside of chamber 11. The arrangement is that there is a tight fit between the walls of neck 21 and the top wall of chamber 11 to keep chamber 11 sealed from the outside air. A removable cap 21a covers the top opening of neck 21. The container 20 may contain a beverage such as beer 24. There is no communication between the beverage 24 in container 20 and the water 14 in chamber 11.

As illustrated in FIG. 2, the container is shaped like a bottle. The contour of container 20 is parallel to the contour of chamber 11. This makes container 20 appear as a double walled bottle with inner walls 24 and outer walls 25. The chamber 11 appears as an interspace between the walls 24 and 25 of the double-wall bottle 20.

The operation of the embodiment of FIG. 2 is exactly similar to the operation described for the embodiment of FIG. 1. When water 14 becomes cold, it cools the immersed container 20 and thus cools the beverage 24 inside container 20.

Figure 3:
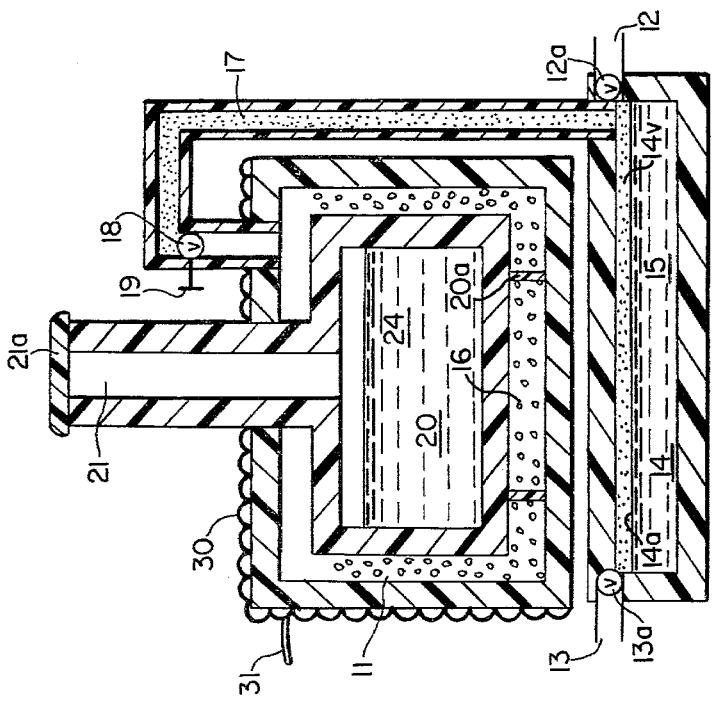
FIG. 3 is a cross-sectional view of the invention in which the cooling effect is renewable.

FIG. 3 illustrates a cooler with a renewable cooling potential. It is similar to the embodiment described in FIG. 2, except that it contains an electric heating mantle 30 which surrounds chamber 15 and tube 17. A detachable electric cord 31 connects the heating mantle 30 to a standard household current. All the other parts of the embodiment in FIG. 3 are exactly similar to the embodiment in FIG. 2 and have been given similar numbers.

The cooling operation of the renewable cooler is exactly as described for the embodiment in FIG. 2. As in the embodiment in FIG. 2, the cooling potential of the device ends when the dessicant becomes saturated and no longer adsorbs newly generated vapor. To renew the cooling potential of the cooling device, the adsorbed water must be expelled from dessicant 16 and returned to container 11. To achieve this, the mantle 30 is connected through the detachable cord 31 to a household current and electrically heated. The heat is transferred from the mantle 30 to chamber 15 and dessicant 16. This causes the water in the dessicant 16 to leave the dessicant and to recondense in the unheated chamber 11. When the dessicant is dry, the tube 17 is closed by valve 18 and the mantle 30 is disconnected from the electric current. The device is then stored until a cooling effect is desired. The cooling effect can be initiated through the reopening of tube 17.

Figure 4:
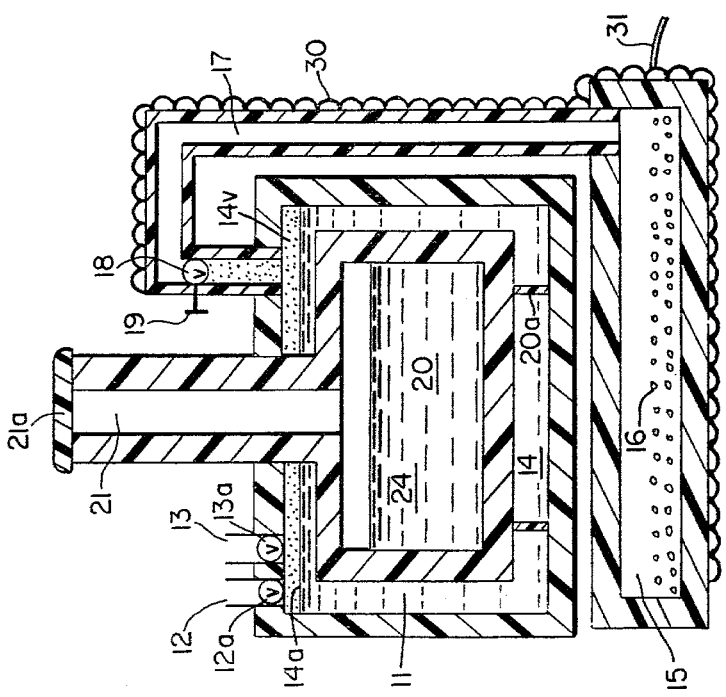
FIG. 4 is a cross-sectional view of the invention which is adapted to function as a renewable warmer.

FIG. 4 is an embodiment of the invention which is adapted to serve as a bottle warmer, instead of a bottle cooler. It is exactly similar to the embodiment described in FIG. 3, except that chamber 11 contains the dessicant 16 instead of the water 14 while chamber 15 contains the water 11 instead of the dessicant 16. The heating coils 30 surround chamber 11 instead of chamber 15. A detachable electric cord 31 connects coils 30 to a household electric current. Inlet 12 and outlet 13, and associated valves 12a and 13a are present on top of chamber 15 instead of chamber 11.

The operation of the warmer is as follows. When a warming action is not desired the valve 18 closes pipe 17 and prevents a communication between chambers 11 and 15. The vacuum in chamber 15 causes the liquid 14 to boil. The vapors of the boiling liquid 14 accumulate in phase 14v of chamber 15. The vapor of 14v exerts a counter-vapor pressure upon water 14. When the counter-vapor pressure upon water 14 becomes equal to the vapor pressure of the water the boiling of the water ceases. The water can then be stored for unlimited periods without losing its warming capacity.

When a warming effect is desired, the handle 19 is pulled to open valve 18 and establish a communication between chambers 11 and 15. When this communication is established the water vapor in the vapor-phase 14v leaves chamber 15 and enters chamber 11 through tube 17. When the water vapor enters chamber 11, it is absorbed by dessicant 16. This raises the temperature of the dessicant to above ambient temperature. The heat is transferred to the container 20 and beverage 23 and warming of beverage 23 is achieved.

The adsorption of the vapors in dessicant 16 stops when the dessicant becomes saturated with the vapor. To renew the warming potential of the bottle the vapor must be expelled from dessicant 16 and chamber 11 and returned to the body of water 14 in chamber 15. This is accomplished by connecting cord 31 to a household electrical system to heat container 11. This causes the water to leave chamber 11 and dessicant 16 and to recondense in chamber 15. When the dessicant 16 is dry the valve 18 closes pipe 17 and the warmer can be stored until a warming effect is desired.

It is understood that the shape of the renewable warmer may be adapted to warm a variety of objects without departing from the essence of the invention. For example, the shape of the warmer may be adapted to fit around a car engine or a car battery to help start the car in a cold day. The electric heating mantle 30 may be substituted by other heating means, e.g. by pipes circulating hot water obtained from a car radiator, or by pipes circulating hot exhaust gases.

While the invention has utilized water as the working liquid, it is understood that other liquids or a mixture of different liquids may be used without departing from the essence of the invention. For example, an antifreeze solution may be added to water 14 to prevent the freezing of the working liquid during storage at cold ambient temperature. Other changes may be made without departing from the essence of the invention as described in the claims.

What is claimed is:

1. A disposable cooler consisting of a double-wall container,
    water in an interspace between said walls,
    at least a partial vacuum in said interspace to lower the boiling point of said water.
    a second container,
    a dessicant in said container,
    a communication between the containers to allow a sorption of vapors generated by the evaporation of said water,
    and means to reversibly close said communication to allow an unlimited storage of said disposable cooler.

2. The invention as described in claim 1 and including means for drying said dessicant.

3. A temperature changing device consisting of a chamber,
    a liquid in said chamber,
    at least a partial air-vacuum in said chamber to lower the boiling temperature of said liquid,
    a second chamber,
    a dessicant in said second chamber,
    said dessicant having an affinity for vapors generated by said liquid,
    a communication between said vapors and said dessicant, to obtain a sorption of said vapors by said dessicant,
    at least one of the chambers being spaced between a double wall container,
    and means to reversibly close said communication to obtain an unlimited storage of the temperature-changing potential of said temperature-changing device.

4. A temperature changing device consisting of a chamber,
    a liquid in said chamber,
    at least a partial air-vacuum in said chamber to lower the boiling temperature of said liquid,
    a second chamber,
    a dessicant in said second chamber,
    said dessicant having an affinity for vapor generated by said liquid,
    a communication between said vapors and said dessicant, to obtain a sorption of said vapors by said dessicant,
    means to reversibly close said communication to obtain an unlimited storage of the temperature-changing potential of said temperature-changing device,
    and a container immersed in said liquid to obtain a cooling of said container.

5. A temperature changing device consisting of a chamber.
    a liquid in said chamber,
    at least a partial air-vacuum in said chamber to lower the boiling temperature of said liquid,
    a second chamber,
    a dessicant in said second chamber,
    said dessicant having an affinity for vapors generated by said liquid,
    a communication between said vapors and said dessicant, to obtain a sorption of said vapors by said dessicant,
    means to reversibly close said communication to obtain an unlimited storage of the temperature-changing potential of said temperature-changing device,
    and electric heating coil means to expel said vapor from said dessicant to obtain a reactivation of said dessicant.

* * * * *